United States Patent
Kuchi et al.

(10) Patent No.: US 9,806,913 B1
(45) Date of Patent: Oct. 31, 2017

(54) METHOD FOR ESTIMATING CHANNEL STATES OF PLURALITY OF USER EQUIPMENTS (UES)

(71) Applicant: INDIAN INSTITUTE OF TECHNOLOGY HYDERABAD, Sangareddy (IN)

(72) Inventors: Kiran Kumar Kuchi, Hyderabad (IN); Makandar Sibgath Ali Khan, Hyderabad (IN)

(73) Assignee: INDIAN INSTITUTE OF TECHNOLOGY HYDERABAD, Telangana (IN)

( * ) Notice: Subject to any disclaimer, the term of this patent is extended or adjusted under 35 U.S.C. 154(b) by 0 days.

(21) Appl. No.: 15/409,895

(22) Filed: Jan. 19, 2017

(30) Foreign Application Priority Data

Jul. 27, 2016 (IN) .............................. 201641025741

(51) Int. Cl.
*H04L 25/02* (2006.01)
*H04L 5/00* (2006.01)

(52) U.S. Cl.
CPC .......... *H04L 25/0242* (2013.01); *H04L 5/005* (2013.01)

(58) Field of Classification Search
CPC ........................ H04L 25/0236; H04L 25/0202
USPC ........... 455/452.1, 509, 67.11, 450; 370/328, 370/329
See application file for complete search history.

(56) References Cited

U.S. PATENT DOCUMENTS

| | | | |
|---|---|---|---|
| 7,242,724 B2 * | 7/2007 | Alexiou | H04B 7/0626 375/267 |
| 2010/0310017 A1 * | 12/2010 | Atungsiri | H04L 1/0668 375/340 |
| 2015/0215063 A1 * | 7/2015 | Kuchi | H04J 11/005 370/329 |

* cited by examiner

*Primary Examiner* — John J Lee (57) ABSTRACT

Embodiments herein provide a method of estimating channel states of a plurality of user equipments (UEs) in a single instance. The method includes receiving pilot samples from the plurality of UEs. The method includes selecting a predetermined number of tones, wherein the channel associated with each UE across the selected pre-determined number of tones is same. The method includes collecting the received pilot samples from each pilot symbol and stacking the received pilot samples as a vector. Further, the method includes constructing a matrix. The matrix includes known pilot values used by each UE. Furthermore, the method includes estimating channel states of the plurality of UEs by applying a filter on the vector formed from the received pilot samples. The number of channel states to be estimated is reduced by selecting the pre-determined number of tones.

5 Claims, 7 Drawing Sheets

METHOD FOR ESTIMATING CHANNEL STATES OF PLURALITY OF USER EQUIPMENTS (UES)

FIELD OF INVENTION

The embodiments herein relates to wireless communication network and more particularly to a method for estimating channel states of a plurality of user equipments (UEs) in a single instance. The present application is based on, and claims priority from an Indian Application Number 201641025741 filed on 27 Jul. 2016, the disclosure of which is hereby incorporated by reference.

BACKGROUND OF INVENTION

Long-term evolution (LTE) is a wireless standard which serves a large number of user equipments (UEs). The LTE standard uses a minimum bandwidth of 180 KHz for communication with the devices. In downlink (DL), the LTE uses orthogonal frequency division multiple access (OFDMA) and single-carrier FDMA (SC-FDMA) in an uplink (UL). With 15 KHz subcarrier spacing, there are 12 subcarriers available for scheduling pilot tones. The LTE defines three physical layer channels in the UL namely physical uplink shared channel (PUSCH), which carries user data and some control information, physical uplink control channel (PUCCH) which carries uplink feedback data and physical random access channel (PRACH) for initial access purposes.

In order to improve reliability and efficiency of the control channel, the LTE defines a retransmission mechanism which involves in acknowledgement (ACK) and non-acknowledgement (NACK) transmissions. Feedback signals are sent by UEs in response to successful reception of a downlink data packet are termed as ACKs and messages that indicate failure of reception of certain block of data are termed as NACKs. In uplink, UEs are scheduled such that:
(1) The UEs does not have uplink data to transmit but they do have uplink feedback data such as ACK/NACK, channel quality feedback and so on. In such cases, the UEs transmit feedback data in the PUCCH.
(2) The UEs have both feedback data and uplink data to transmit. The feedback data is multiplexed with uplink data and transmitted on the PUSCH.

Depending on type of feedback data being transmitted, the PUCCH is categorized into various formats. Format 1 is used for carrying a positive scheduling request, Format 1A to transmit 1 bit ACK/NACK in case of single code word downlink transmission and format 1B to transmit 2 bit ACK/NACK in case of two code word downlink transmission. Format 2 for sending stand-alone CSI report, Format 2A carries CSI report multiplexed with 1 bit ACK/NACK and Format 2B carries CSI report multiplexed with 2 bit ACK/NACK.

The PUCCH is structured to exploit frequency diversity to minimize the resources needed for feedback data transmission. Accordingly, frequency resource for PUCCH is configured at edges of uplink system bandwidth. Each PUCCH transmission occupies one resource block (RB) at or near the edge of system bandwidth followed with $2^{nd}$ resource block placed at or near opposite edge of system bandwidth. Each resource block constitutes of 12 OFDM sub-carriers and 6 or 7 OFDM symbols depending on nature of cyclic prefix being used.

In the existing systems, channel state for each UE is estimated based on pilot codes transmitted on each tone (sub-carrier) and symbol, individually for each UE. Thus, in the existing systems, the channel state of each UE estimated individually which consumes more number of cycle counts (i.e., processing time) required for detecting control data at a receiver.

SUMMARY

The principal object of the embodiments herein is to provide a method for estimating channel states of a plurality of user equipments (UEs) in a single instance.

Another object of the embodiments herein is to provide a method for reducing number of channel states to be estimated is reduced by selecting the pre-determined number of tones for which the channel states of the UE is same.

Another object of the embodiments herein is to provide a method for detecting control data of the plurality UEs simultaneously.

Another object of the embodiments herein is to provide a low complexity receiver to reduce number of cycle counts for estimating channel states of the plurality of UEs in a single instance.

Accordingly the embodiments herein provide a method for estimating channel states of a plurality of user equipments (UEs) in a single instance. The method includes receiving pilot samples from the plurality of UEs. The method includes selecting a predetermined number of tones. The method includes collecting the received pilot samples from each pilot symbol and stacking the received pilot samples as a vector. Further, the method includes constructing a matrix. The matrix includes known pilot values used by each UE. Furthermore, the method includes estimating channel states of the plurality of UEs by applying a filter on the vector formed from received pilot samples. The number of channel states to be estimated is reduced by selecting the pre-determined number of tones.

Accordingly the embodiments herein provide a base station for estimating channel states of a plurality of user equipments (UEs) in a single instance. The base station includes a receiver configured to receive pilot samples from the plurality of UEs. The receiver is configured to select a predetermined number of tones. The receiver is configured to collect the received pilot samples from each pilot symbol and stack the received pilot samples as a vector. Further, the receiver is configured to construct a matrix. The matrix includes known pilot values used by each UE. Furthermore, the receiver is configured to estimate channel states of the plurality of UEs by applying a filter on the vector formed from received pilot samples. The number of channel states to be estimated is reduced by selecting the pre-determined number of tones.

A computer program product comprising computer executable program code recorded on a computer readable non-transitory storage medium, the computer executable program code when executed causing the actions including receiving pilot samples from the plurality of UEs. The computer executable program code when executed causing the further actions including receiving pilot samples from the plurality of UEs. The computer executable program code when executed causing the further actions including selecting a predetermined number of tones. The computer executable program code when executed causing the further actions including collecting the received pilot samples from each pilot symbol and stacking the received pilot samples as a vector. The computer executable program code when executed causing the further actions including constructing a matrix. The matrix includes known pilot values used by each UE. The computer executable program code when executed causing the further actions including estimate channel states of the plurality of UEs by applying a filter on the vector formed from received pilot samples. The number of channel states to be estimated is reduced by selecting the pre-determined number of tones.

These and other aspects of the embodiments herein will be better appreciated and understood when considered in conjunction with the following description and the accompanying drawing. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

This invention is illustrated in the accompanying drawings, throughout which like reference letters indicate corresponding parts in the various figures. The embodiments herein will be better understood from the following description with reference to the drawings, in which.

DETAILED DESCRIPTION OF INVENTION

The embodiments herein and the various features and advantageous details thereof are explained more fully with reference to the non-limiting embodiments that are illustrated in the accompanying drawing and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

Embodiments herein provide a method for estimating channel states of a plurality of user equipments (UEs) in a single instance. The method includes receiving pilot samples from the plurality of UEs. The method includes selecting a predetermined number of tones. The method includes collecting the received pilot samples from each pilot symbol and stacking the received pilot samples as a vector. Further, the method includes constructing a matrix. The matrix includes known pilot values used by each UE. Furthermore, the method includes estimating channel states of the plurality of UEs by applying a filter on the vector formed from the received pilot samples.

In an embodiment, number of channel states to be estimated is reduced by selecting the pre-determined number of tones for which the channel states of the UE is same.

In an embodiment, size of the matrix need to be inverted is reduced by a factor equal to the selected pre-determined number of tones.

In an embodiment, the channel states of the plurality of UEs are estimated concurrently after receiving the pilot samples from each UE.

Unlike the conventional mechanisms, where the channel state of each UE is estimated individually, with the proposed method the channel states of the plurality of UEs can be estimated in a single instance. The channel states of the plurality of UEs can be estimated by selecting the pre-determined number of tones, for which the channel variation is low.

With the proposed method, a receiver in a base station can estimate channel states of the plurality of UEs by leveraging inherent orthogonal nature of demodulation reference symbols employed in the PUCCH format 1A/1B. Further, with the proposed method, a detector in the receiver can detect the control data of all 'N' multiplexed UE's simultaneously. The proposed method can be used to minimize processing time required for detecting control data and maximizing the detection performance of Acknowledgement/Negative-Acknowledgement (ACK/NACK) bits at the receiver.

The proposed method can be used to estimate the channel states of a single UE or multiple UEs. Further, the proposed method can be applied on any OFDM system to estimate the channel states of the plurality of UEs in a single instance.

Referring now to the drawings and more particularly to FIGS. 1 through 7 where similar reference characters denote corresponding features consistently throughout the figures, there are shown preferred embodiments.

Figure 1:
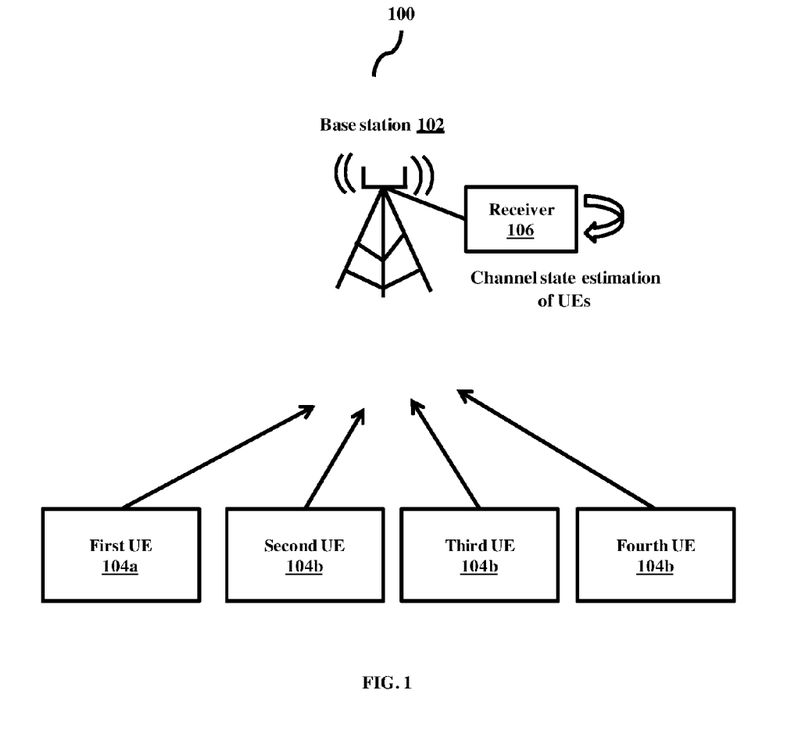
FIG. 1 illustrates a wireless communication network in which a base station estimates channel state of a plurality of user equipments (UEs) in a single instance, according to the embodiments as disclosed herein.

FIG. 1 illustrates a wireless communication network 100 in which a base station estimates channel states of a plurality of user equipments (UEs), according to the embodiments as disclosed herein. As depicted in the FIG. 1, the wireless communication network 100 includes a base station 102, a plurality of UEs namely a first UE 104a, a second UE 104b, a third UE 104c and a fourth UE 104d. It should be noted that there can be any number of UEs, within the wireless communication network 100 which communicate with the base station 102. Each UE, among the plurality of UEs 104a-104d sends pilot samples to the base station 102, for example through a PUCCH. The base station 102 receives the samples (which are pilot codes) from each UE for estimating channel state of the plurality of UEs in a single instance. The pilot samples received from each UE are known to the base station 102.

The method for estimating channel states of the plurality of UEs 104a-104d is as described herein. The base station 102 receives the pilot samples (i.e., pilot codes in each symbol and each tone) from the plurality of UEs as an acknowledgement for reception of downlink data by the plurality of UEs 104a-104d. The pilot samples denote or indicate the pilot codes transmitted by each UE on each tone and each symbol in the PUCCH. Each PUCCH is a resource block (RB) which includes 12 tones or subcarriers along the frequency domain and symbols across the time domain.

After receiving the pilot samples from the plurality of UEs 104a-104d, the pre-determined number of tones is selected. In an example, the receiver 106 selects the pre-determined number of tones as 2 or 3 or 4 or 5 or 6. When the receiver 106 selects the pre-determined number of tones as 3, the receiver 106 collects the pilot samples for the three tones.

In an embodiment, the received pilot samples are collected and stacked as the vector.

In an embodiment, the receiver 106 constructs a matrix. The matrix includes pilot values used by each UE. After forming the matrix, the receiver 106 selects next three tones in the RB. The receiver 106 collects the pilot samples from each UE for the selected pre-determined number of tones. In this case, the pilot samples are collected from each tone and each symbol. The number of pilot samples collected by the receiver is 9, since the pilot samples are collected from each tone and each symbol (i.e., for three tones and three symbols (3×3)). Further, the collected pilot samples are placed in the matrix.

In an embodiment, the receiver 106 collects the pilot samples of the plurality of UEs. In case, the pre-determined number of tones is selected as 3, then the receiver 106 collects the pilot samples (i.e., 9 samples) from the first UE 104a and the receiver 106 collects the pilot samples from the second UE 104b (i.e., 9 samples). Further, the receiver 106 collects the pilot samples from the third UE 104c (i.e., 9 samples). Thus, the receiver 106 collects all 27 samples (from the UEs 104a, 104b and 104c).

In an embodiment, the matrix is constructed with the pilot values used by each UE. As described in the above mentioned example, the 27 pilot samples are placed in the matrix for estimating the channel state of the plurality of UEs 104a, 104b and 104c. The channel state of the plurality of UEs is estimated based on the collected pilot samples in a single instance. Unlike the conventional mechanisms, where the channel state of each UE is estimated individually, with the proposed method can be used to estimate the channel states of the plurality of UEs in single instance.

The FIG. 1 shows a limited overview of the wireless communication network 100 but it is to be understood that other embodiments are not limited thereon. Further, the labels such as the first UE 104a, second UE 104b, third UE 104c and the fourth UE 104d are the names used only for illustrative purpose and does not limit the scope of the invention. Further, the first set of samples received from the first UE 104a and the second set of samples received from the second UE 104b is mentioned for better understanding of the embodiments described herein. It should be noted that there can be any number of UEs which can transmit samples to the base station 102 for estimating the channel state in a single instance.

Figure 2:
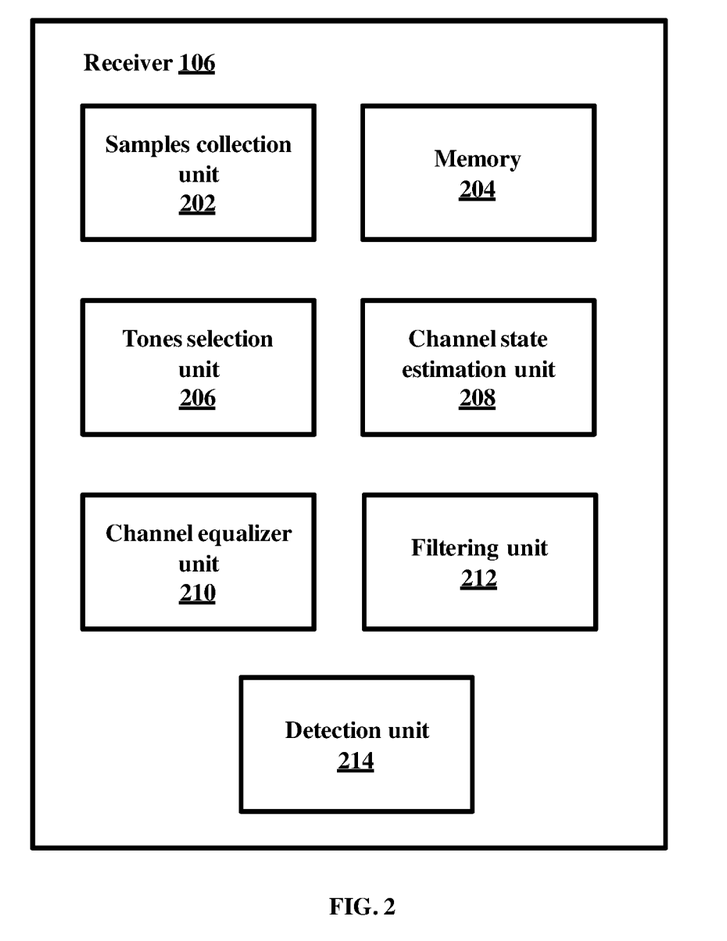
FIG. 2 illustrates various units in a receiver in the base station described in the FIG. 1 for estimating channel states of the plurality of UEs, according to the embodiments as disclosed herein.

FIG. 2 illustrates various units in a receiver 106 of the base station 102 described in the FIG. 1 for estimating channel state of the plurality of UEs, according to the embodiments as disclosed herein. As depicted in the FIG. 2, the receiver 106 includes a samples collection unit 202, a memory 204, tone selection unit 206, channel estimation unit 208, a channel equalizer unit 210, a filtering unit 212 and a detection unit 214.

In an embodiment, the samples collection unit 202 is configured to collect the pilot samples for the predetermined number of tones. The pilot samples are collected from each tone and each symbol. In an example, the receiver 106 selects the pre-determined number of tones as 2 or 3 or 4 or 5 or 6. When the receiver selects the pre-determined number of tones as 3, the samples collection unit 202 collects pilot tones for the three tones. In this case, the number of pilot samples collected by the samples collection unit is 9, since the pilot samples are collected on each tone and each symbol in the RB.

In an embodiment, the memory 204 stores the collected pilot in the matrix. The memory 204 may include one or more computer-readable storage media. The memory 204 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 204 may, in some examples, be considered a non-transitory storage medium. The term "non-transitory" may indicate that the storage medium is not embodied in a carrier wave or a propagated signal. However, the term "non-transitory" should not be interpreted that the memory 204 is non-movable. In some examples, the memory 204 can be configured to store larger amounts of information than the memory. In certain examples, a non-transitory storage medium may store data that can, over time, change (e.g., in Random Access Memory (RAM) or cache).

In an embodiment, the tones selection unit 206 is configured to select the pre-determined number of tones in the RB. In an example, the pre-determined number of tones can be either 2 or 3 or 4 or 5 or 6 for channel states estimation of plurality of UEs 104a-104d.

In an embodiment, the channel state estimation unit 208 is configured to estimate the channel states of the plurality of UEs 104a-104d in a single instance. The channel state estimation unit 208 is configured to obtain the collected pilot samples in the RB from the samples collection unit 202 to estimate the channel states of the plurality of UEs 104a-104d in a single instance.

In an embodiment, the channel equalizer unit 210 is configured to perform channel equalization on an OFDM signal of the frequency domain by using the pilot codes in order to remove an effect of the channel.

In an embodiment, the code matched filtering unit 212 is configured to despread a spreading code of a pilot signal and a data signal.

In an embodiment, the detection unit 214 is configured to detect the ACK or the NACK received from the plurality of UEs 104a-104d simultaneously after estimating the channel states of the plurality of UEs 104a-104d.

Figure 3:
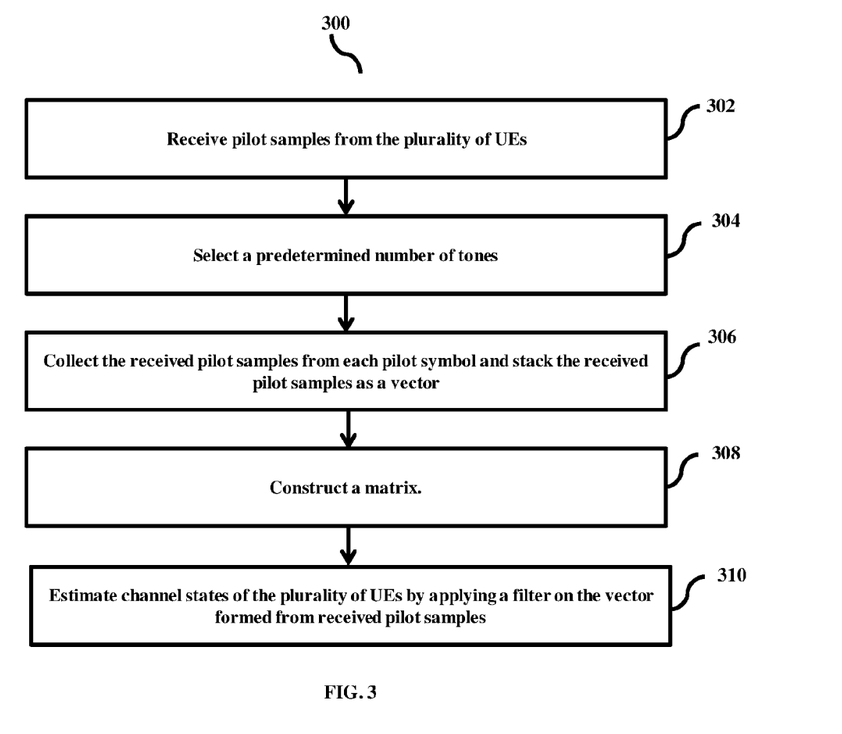
FIG. 3 is a flow diagram illustrating a method for estimating channel states of the plurality of UEs, according to the embodiments as disclosed herein.

FIG. 3 is a flow diagram illustrating a method 300 for estimating channel states of the plurality of UEs, according to the embodiments as disclosed herein. In case of multipath channels with relatively smaller Dopplers, the channel states across adjacent SC-FDMA symbols is almost be identical and also channel variation will be relatively low across 2 to 3 frequency tones in case of highly frequency selective channels. Consider that the channel is to be identical for 'B' frequency tones and across 'P' SC_FDMA symbols, then the channel states across adjacent SC-FDMA symbols is equal, which is denoted as $$h_{1,1}{}^P = h_{1,2}{}^P = \ldots = h_{1,k}{}^P \qquad (1)$$

At step 302, the method 300 includes receiving pilot samples from the plurality of UEs. The method 300 allows the samples collection unit 204 to receive the pilot samples from the plurality of UEs.

When channel across $N_{sym}^{DMRS}$ pilot symbols and tones such as for example 13' tones is considered to be same similar, then the collected pilot samples across $N_{sym}^{DMRS} \times B$ resource elements, after the receiver front end processing can be represented as $$y_{k,l} = hc_{k,l} + n_{k,l}$$

$$k \in [1,B], l \in [1, N_{sym}^{DMRS}] \quad (2)$$

Where $c_{k,l}$ are the transmitted pilot codes on the $N_{sym}^{DMRS} \times B$ resource elements, subsequently for the case of the plurality of UEs can be represented as $$y_{k,l} = \sum_{i=1}^{N} h^i c_{k,l}^i + n_{k,l} \quad (3)$$

Where $h^i$ is the channel state estimate across $N_{sym}^{DMRS} \times B$ tones for $i^{th}$ UE. $C_{k,l}^i$ are the transmitted codes of $i^{th}$ UE on $N_{sym}^{DMRS} \times B$ resource elements.

At step 304, the method 300 includes selecting the pre-determined number of tones. The method 300 allows the tone selection unit 206 to select the pre-determined number of tones. In an example, the receiver 106 selects the pre-determined number of tones as 2 or 3 or 4 or 5 or 6.

At step 306, the method 300 includes collecting the received pilot samples from each pilot symbol and stacking the received pilot samples as the vector. The method 300 allows the samples collection unit 202 to collect the pilot samples from each pilot symbol and stack the received pilot samples as the vector. When the receiver selects the pre-determined number of tones as 3, the receiver 106 collects the pilot samples for the three tones. The pilot samples are collected from each tone and each symbol. The number of pilot samples collected by the receiver is 9, since the pilot samples are collected from each tone and each symbol (i.e., for three tones and three symbols (3×3)). Further, the collected pilot samples are stacked as the vector as mentioned in the equation (4).

At step 308, the method 300 includes constructing the matrix. The matrix includes known pilot values used by each UE. The method 300 allows the channel estimation state unit 208 to construct the matrix with known pilot values used by each UE.

It should be noted that, for each UE, all the received SC-FDMA symbols and frequency tones that are considered to have same or similar channel states are stacked up in column vector format.

$$Y = \sum_{i=1}^{N} h^i C^i + N \quad (4)$$

Where $$Y = \begin{bmatrix} Y_1 \\ Y_2 \\ \vdots \\ Y_{N_{sym}^{DMRS}} \end{bmatrix}$$

$$Y_l = [Y_{(g-1)*B+1,l} \ldots Y_{g*B,l}]^T$$

$$C^i = \begin{bmatrix} C_1 \\ C_2 \\ \vdots \\ C_N^{DMRS} \end{bmatrix}$$

$$C_l^i = [C_{(g-1)*B+1}^i \ldots C_{(g-1)*B,l}^i]^T$$

The receiver 106 collects the pilot samples of the second UE 104b and the third UE 104c respectively. The pilot samples are collected from each tone and each symbol. The number of pilot samples corresponding to the second UE 104b, collected by the receiver is 9, since the pilot samples are collected from each tone and each symbol (i.e., for three tones and three symbols (3×3)). Further, the receiver 106 collects the pilot samples from the third UE 104c.

After collecting the pilot samples from the first UE 104a, the second UE 104b and the third UE 104c, the collected pilot samples are placed in the matrix. The method 300 allows the channel state estimation unit 208 to place the pilot samples of each UE in the matrix. The matrix includes known pilot values used by each UE.

The equation (4) can also be represented as given below in the equation (5), where transmitted code vectors from each UE are arranged as columns of a matrix.

$$Y = [C^1 C^2 \ldots C^N]H + N \quad (5)$$

Where $H = [h_1, h_2, \ldots h_i \ldots h_N]^T$ denotes channel states of the plurality multiplexed UEs across $N_{sym}^{DMRS} \times B$ tones (i.e., the pre determined number of tones).

Representation of equation (5) for three UEs is mentioned below.

$$Y = \begin{bmatrix} x1 \\ x2 \\ x3 \\ x4 \\ x5 \\ x6 \\ x7 \\ x8 \\ x9 \end{bmatrix} h1 + \begin{bmatrix} x1 \\ x2 \\ x3 \\ x4 \\ x5 \\ x6 \\ x7 \\ x8 \\ x9 \end{bmatrix} h2 + \begin{bmatrix} x1 \\ x2 \\ x3 \\ x4 \\ x5 \\ x6 \\ x7 \\ x8 \\ x9 \end{bmatrix} h3 + N$$

In the above representation, x1, x2 ... x9 denote the pilot samples received from the first UE 104a. In the similar manner, the pilot samples x1, x2 ... x9 are received from the second UE 104b and the pilot samples x1, x2 ... x9 are obtained from the third UE 104c. Further, in the above representation h1, h2 and h3 denote the channel states of the three UEs. In this manner, nine samples are collected from each UE which provides total number of 27 samples from the three UEs for estimating the channel states of three UEs in a single instance.

The equation (5) can be represented as mentioned below $$Y = AH + N \quad (6)$$

where A denotes the pilot samples obtained from the UEs and H is the denotes channel states of the plurality of UEs.

In order to obtain 'H', the equation (6) is solved by applying the least-square (LS) method in such a way that the following cost function is minimized.

$$J(H) = \|Y - AH\|^2 = (Y - AH)^\dagger (Y - AH) \quad (7)$$

At step 310, the method 300 includes estimating the channel states of the plurality of UEs by applying the filter on the vector formed from received pilot samples. The method 300 allows the channel state estimation unit 208 to estimate the channel states of the plurality of UEs by applying the filter on the vector formed from received pilot samples. The channel states of the plurality of UEs 104a-104d is estimated based on the collected pilot samples (i.e., the 27 samples from three UEs) in a single instance. The number of channel states to be estimated is reduced by selecting the pre-determined number of tones.

From the equation (7), optimum 'H' which minimizes the cost function is given by $$\frac{\partial J(H)}{\partial(H)} = 0$$

and 'H' is obtained as $$H = (A^\dagger A)^{-1} A^{\dagger *} Y \quad (8)$$

It should be noted that the size of the matrix A, which needs to be inverted is reduced by a factor equal to the selected pre-determined number of tones.

The above equation (8) provides channel states of the plurality of UEs 104a-104d across $N_{sym}^{DMRS}$ symbols and the pre-determined number of tones, for example 'B' tones. The above procedure from equation 8 through equation 12 is repeated for the next set of B frequency tones for $$\frac{N_{sym}^{RB}}{B}$$

times to estimate the channel coefficients across all $N_{sym}^{RB}$ frequency tones and $N_{sym}^{DMRS}$ symbols.

The proposed method 300 can be applied to estimate the channel states of a single UE or the plurality of UEs. The channel states of the plurality of UEs are estimated concurrently after receiving the pilot samples from each UE.

The various actions, acts, blocks, steps, or the like in the method 300 may be performed in the order presented, in a different order or simultaneously. Further, in some embodiments, some of the actions, acts, blocks, steps, or the like may be omitted, added, modified, skipped, or the like without departing from the scope of the invention.

Figure 4:
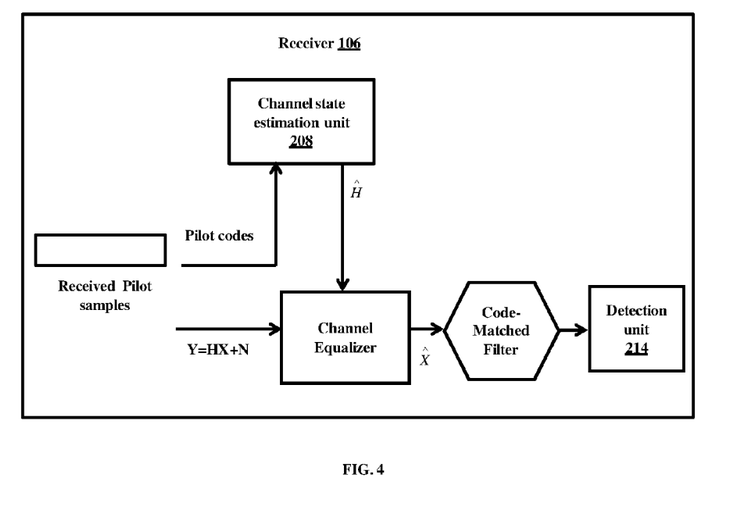
FIG. 4 illustrates communication among various units in the receiver for decoding a physical uplink control channel (PUCCH), according to the embodiments as disclosed herein.

FIG. 4 illustrates communication among various units in the receiver 106 for decoding physical uplink control channel (PUCCH), according to the embodiments as disclosed herein. As depicted in the FIG. 4, the pilot samples are received by the channel state estimation unit 208. The pilot codes are extracted by the channel estimation unit 208. Further, the channel state estimation unit 208 estimates the channel states of the plurality of UEs (i.e., Ĥ) in a single instance by applying the filter on the vector formed from the received pilot samples. Further, the channel equalizer unit 210 performs channel equalization by using the pilot codes in order to remove an effect of the channel. The code matched filtering unit 212 is configured to despread the spreading code of a pilot signal and a data signal. Furthermore, the detector detects the ACK or the NACK received from the plurality of UEs 104a-104d simultaneously after estimating the channel state of the plurality of UEs 104a-104d.

Figure 5:
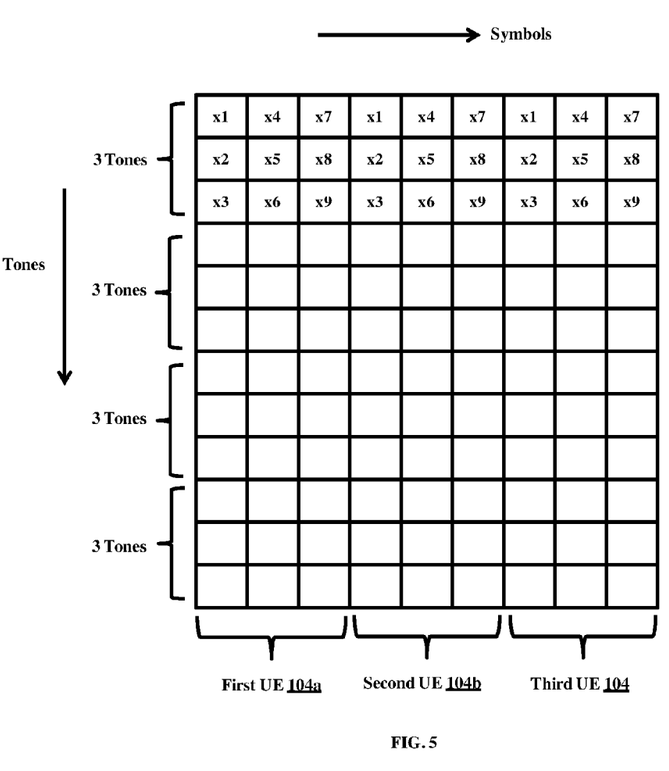
FIG. 5 illustrates a grid with pilot tones and symbols of three UEs, according to the embodiments as disclosed herein

FIG. 5 illustrates a grid with pilot tones and symbols for three UEs, according to the embodiments as disclosed herein. In this illustration, the number of pre-determined tones is selected as 3 tones. As depicted in the FIG. 5, the receiver 106 receives the pilot samples (i.e., x1 to x9) from the first UE 104a, from the second UE 104b and from the third UE 104c respectively. For the first three tones the pilot tones corresponding to the first UE 104a are collected by the samples collection unit 202. The pilot samples collected are placed in the matrix Y as mentioned in the equation (4). The pilot samples (i.e., x1 to x9 corresponding to the first UE 104a) are placed in a column vector format in the matrix Y. After placing the pilot samples in the matrix Y, the pilot samples corresponding to the second UE 104a are collected by the samples collection unit 202. Further, the collected pilot samples are placed in the matrix Y as mentioned in the equation (4). The pilot samples (i.e., x1 to x9 corresponding to the second UE 104a) are placed in the column vector format in the matrix Y. Furthermore, the pilot samples from the third UE 104c are collected by the samples collection unit and the collected pilot samples are placed in the matrix 'Y' in the column vector format. The channel state of the three UEs 104a, 104b and 104c can be estimated in a single instance by solving the equation (6) using the LS method. After estimating the channel states of the three UEs 104a, 104b and 104c, the next set of tones (which is 3 tones) is selected and in the similar manner as explained above, the pilot samples corresponding to the first UE 104a and the pilot samples corresponding to the second UE 104b and the third UE 104c are collected and placed in the matrix Y. Further, the equation (6) is solved for estimating the channel states of the first UE 104a, the second UE 104b and the third UE 104c respectively in a single instance. It should be noted that channel state estimation for the pre-determined number of tones is repeated for $$\frac{N_{sym}^{RB}}{B}$$

times to estimate the channel state of the all $N_{sym}^{RB}$ frequency tones and $N_{sym}^{DMRS}$ symbols.

Figure 6:
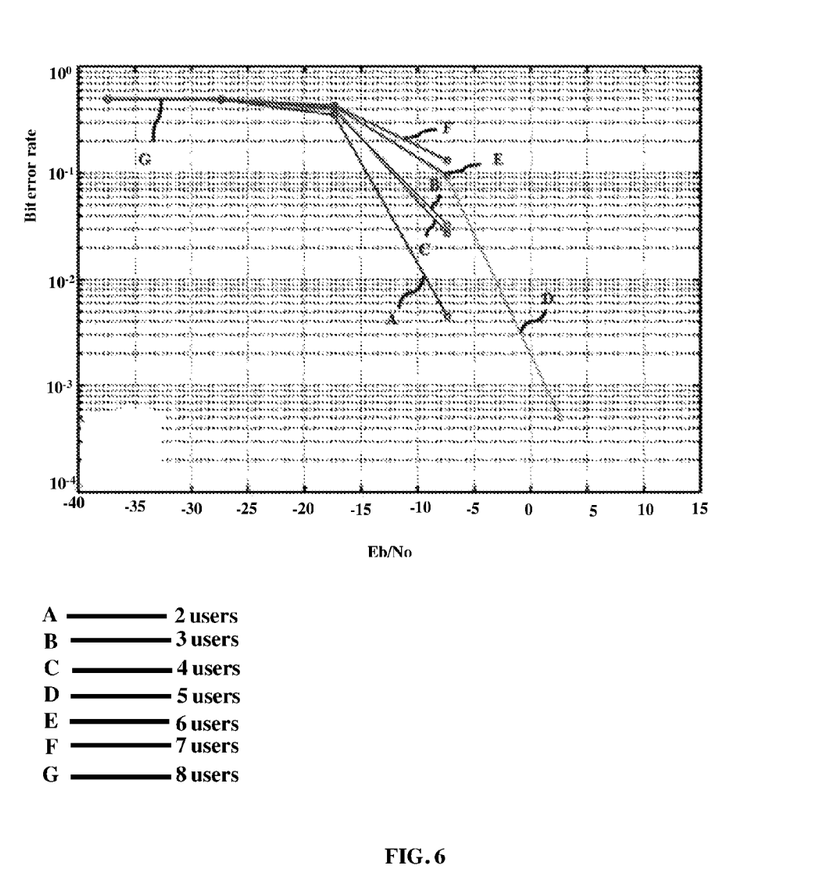
FIG. 6 is a graph showing variation of bit error rate (BER) with energy per bit to noise power spectral density ratio (Eb/No) for eight UEs, according to the embodiments as disclosed herein.

FIG. 6 is a graph showing variation of bit error rate (BER) with energy per bit to noise power spectral density ratio (Eb/No) for eight UEs, according to the embodiments as disclosed herein. From the graph in the FIG. 6, As shown in FIG. 7, it can be understood that the channel states estimation method 300 provides an improved BER performance as compared with the conventional channel estimation methods, under the same data rate and transmission power.

Figure 7:
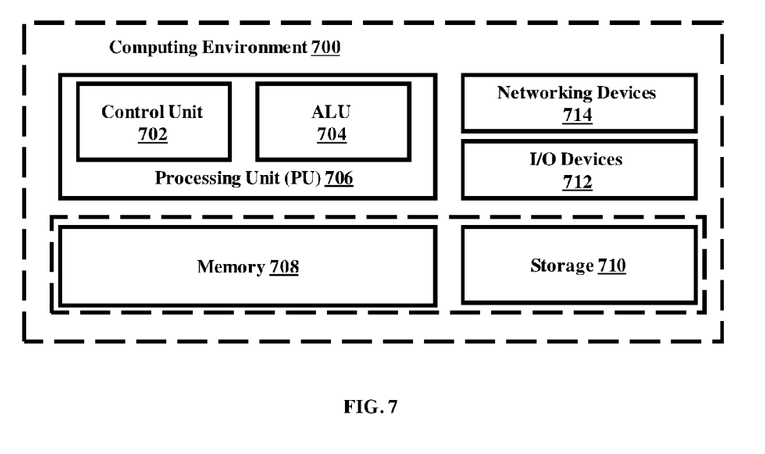
FIG. 7 illustrates a computing environment implementing the method for estimating channel states of the plurality of UEs, according to the embodiments as disclosed herein.

FIG. 7 illustrates a computing environment implementing the method for estimating channel states of the plurality of UEs, according to the embodiments as disclosed herein. As depicted in the FIG. 7, the computing environment 700 comprises at least one processing unit 606 that is equipped with a control unit 702 and an Arithmetic Logic Unit (ALU) 704, a memory 708, a storage unit 710, plurality of networking devices 714 and a plurality of Input output (I/O) devices 712. The processing unit 706 is responsible for processing the instructions of the algorithm. The processing unit 706 receives commands from the control unit 702 in order to perform its processing. Further, any logical and arithmetic operations involved in the execution of the instructions are computed with the help of the ALU 704.

The overall computing environment 700 can be composed of multiple homogeneous and/or heterogeneous cores, multiple CPUs of different kinds, special media and other accelerators. The processing unit 706 is responsible for processing the instructions of the algorithm. Further, the plurality of processing units 706 may be located on a single chip or over multiple chips.

The algorithm comprising of instructions and codes required for the implementation are stored in either the memory unit 508 or the storage 710 or both. At the time of execution, the instructions may be fetched from the corresponding memory 708 or storage 710, and executed by the processing unit 706.

In case of any hardware implementations various networking devices 714 or external I/O devices 712 may be connected to the computing environment to support the implementation through the networking unit and the I/O device unit.

The embodiments disclosed herein can be implemented through at least one software program running on at least one hardware device and performing network management functions to control the elements. The elements shown in the FIGS. 1 through 7 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed:

1. A method for estimating channel states of a plurality of user equipment's (UEs) in a single instance, the method comprising:
   receiving, by a sample collection unit, pilot samples from the plurality of UEs;
   selecting, by a tones selection unit, a predetermined number of tones;
   collecting, by the sample collection unit, the received pilot samples from each pilot symbol and stacking the received pilot samples as a vector;
   constructing, by a channel state estimation unit, a matrix, wherein matrix includes known pilot values used by each UE; and
   estimating, by the channel state estimation unit, the channel states of the plurality of UEs by applying a filter on the vector formed from the received pilot samples, wherein number of channel states to be estimated is reduced by selecting the pre-determined number of tones, wherein the channel states of the plurality of UEs are estimated concurrently after receiving the pilot samples from each UE.

2. The method of claim 1, wherein size of the matrix need to be inverted is reduced by a factor equal to the selected pre-determined number of tones.

3. A base station for estimating channel states of a plurality of user equipments (UEs) in a single instance, the base station comprising:
   a sample collection unit configured to receive pilot samples from the plurality of UEs;
   a tones selection unit configured to select a predetermined number of tones;
   the sample collection unit configured to collect the received pilot samples from each pilot symbol and stacking the received pilot samples as a vector; and
   a channel state estimation unit configured to:
   construct a matrix, wherein matrix includes known pilot values used by each UE, and
   estimate the channel states of the plurality of UEs by applying a filter on the vector formed from the received pilot samples, wherein number of channel states to be estimated is reduced by selecting the pre-determined number of tone wherein the channel states of the plurality of UEs is estimated concurrently after receiving the pilot samples from each UE.

4. The base station of claim 3, wherein a size of the matrix need to be inverted is reduced by a factor equal to the selected pre-determined number of tones.

5. A computer program product comprising computer executable program code recorded on a computer readable non-transitory storage medium, the computer executable program code when executed causing the actions including:
   receiving, by a base station, pilot samples from the plurality of UEs;
   selecting, by the base station, a predetermined number of tones;
   collecting, by the base station, the received pilot samples from each pilot symbol and stacking the received pilot samples as a vector;
   constructing, by the base station, a matrix, wherein matrix includes known pilot values used by each UE; and
   estimating, by the base station, the channel states of the plurality of UEs by applying a filter on the vector formed from the received pilot samples, wherein number of channel states to be estimated is reduced by selecting the pre-determined number of tones, wherein the channel states of the plurality of UEs is estimated concurrently after receiving the pilot samples from each UE.

\* \* \* \* \*